United States Patent
Brisimi et al.

(10) Patent No.: US 11,443,384 B2
(45) Date of Patent: Sep. 13, 2022

(54) INTELLIGENT POLICY COVERY GAP DISCOVERY AND POLICY COVERAGE OPTIMIZATION

(71) Applicant: INTERNATIONAL BUSINESS MACHINES CORPORATION, Armonk, NY (US)

(72) Inventors: Theodora Brisimi, Dublin (IE); Vanessa Lopez Garcia, Dublin (IE); Valentina Rho, Dublin (IE); John Segrave-Daly, Glenageary (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 16/840,802

(22) Filed: Apr. 6, 2020

(65) Prior Publication Data
US 2021/0312562 A1 Oct. 7, 2021

(51) Int. Cl.
| | |
|---|---|
| *G06Q 40/08* | (2012.01) |
| *G06Q 10/10* | (2012.01) |
| *G06N 5/04* | (2006.01) |
| *G06Q 10/06* | (2012.01) |
| *G06N 20/00* | (2019.01) |
| *G06Q 30/00* | (2012.01) |

(52) U.S. Cl.
CPC .............. *G06Q 40/08* (2013.01); *G06N 5/04* (2013.01); *G06N 20/00* (2019.01); *G06Q 10/0637* (2013.01); *G06Q 10/10* (2013.01); *G06Q 30/018* (2013.01)

(58) Field of Classification Search
CPC .... G06Q 10/0637; G06Q 40/08; G06Q 10/10; G06Q 30/018; G06N 5/04
See application file for complete search history.

(56) References Cited

U.S. PATENT DOCUMENTS

| | | | |
|---|---|---|---|
| 8,209,738 B2 | 6/2012 | Nicol et al. | |
| 8,290,841 B2 | 10/2012 | Beigi et al. | |
| 9,348,895 B2 | 5/2016 | Boa et al. | |
| 10,535,104 B1* | 1/2020 | Mitchell | G06Q 40/08 |
| 10,679,296 B1* | 6/2020 | Devereaux | G06Q 30/0215 |
| 2006/0190369 A1* | 8/2006 | Ryles | G06Q 40/00 |
| | | | 705/35 |
| 2011/0161117 A1 | 6/2011 | Busque et al. | |
| 2012/0123808 A1 | 5/2012 | Jones et al. | |
| 2013/0096955 A1 | 4/2013 | Pesci-Anderson et al. | |
| 2016/0078551 A1* | 3/2016 | Samuels | G06Q 40/08 |
| | | | 705/4 |
| 2017/0177810 A1 | 6/2017 | Fulton et al. | |
| 2018/0255102 A1 | 9/2018 | Ward et al. | |

FOREIGN PATENT DOCUMENTS

AU 2012302018 B2 3/2014

* cited by examiner

*Primary Examiner* — Scott S Trotter
(74) *Attorney, Agent, or Firm* — Griffiths & Seaton PLLC

(57) ABSTRACT

Various embodiments are provided for providing intelligent policy coverage optimization in a computing environment by a processor. One or more policy coverage gaps in one or more operational rules defined by one or more rules, policies, or a combination thereof and associated with one or more non-compliant policy claims associated with the one or more policy coverage gaps may be identified. The one or more policy coverage gaps may be ranked according to one or more selected criteria.

20 Claims, 8 Drawing Sheets

INTELLIGENT POLICY COVERY GAP DISCOVERY AND POLICY COVERAGE OPTIMIZATION

BACKGROUND OF THE INVENTION

Field of the Invention

The present invention relates in general to computing systems, and more particularly to, various embodiments for providing intelligent policy coverage gap discovery and policy coverage optimization using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities.

Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for providing intelligent policy coverage gap discovery and policy coverage optimization in a computing environment by a processor are provided. In one embodiment, by way of example only, a method for providing intelligent policy coverage gap discovery and policy coverage optimization, again by a processor, is provided. One or more policy coverage gaps in one or more operational rules defined by one or more rules, policies, or a combination thereof and associated with one or more non-compliant policy claims associated with the one or more policy coverage gaps may be identified. The one or more policy coverage gaps may be ranked according to one or more selected criteria.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
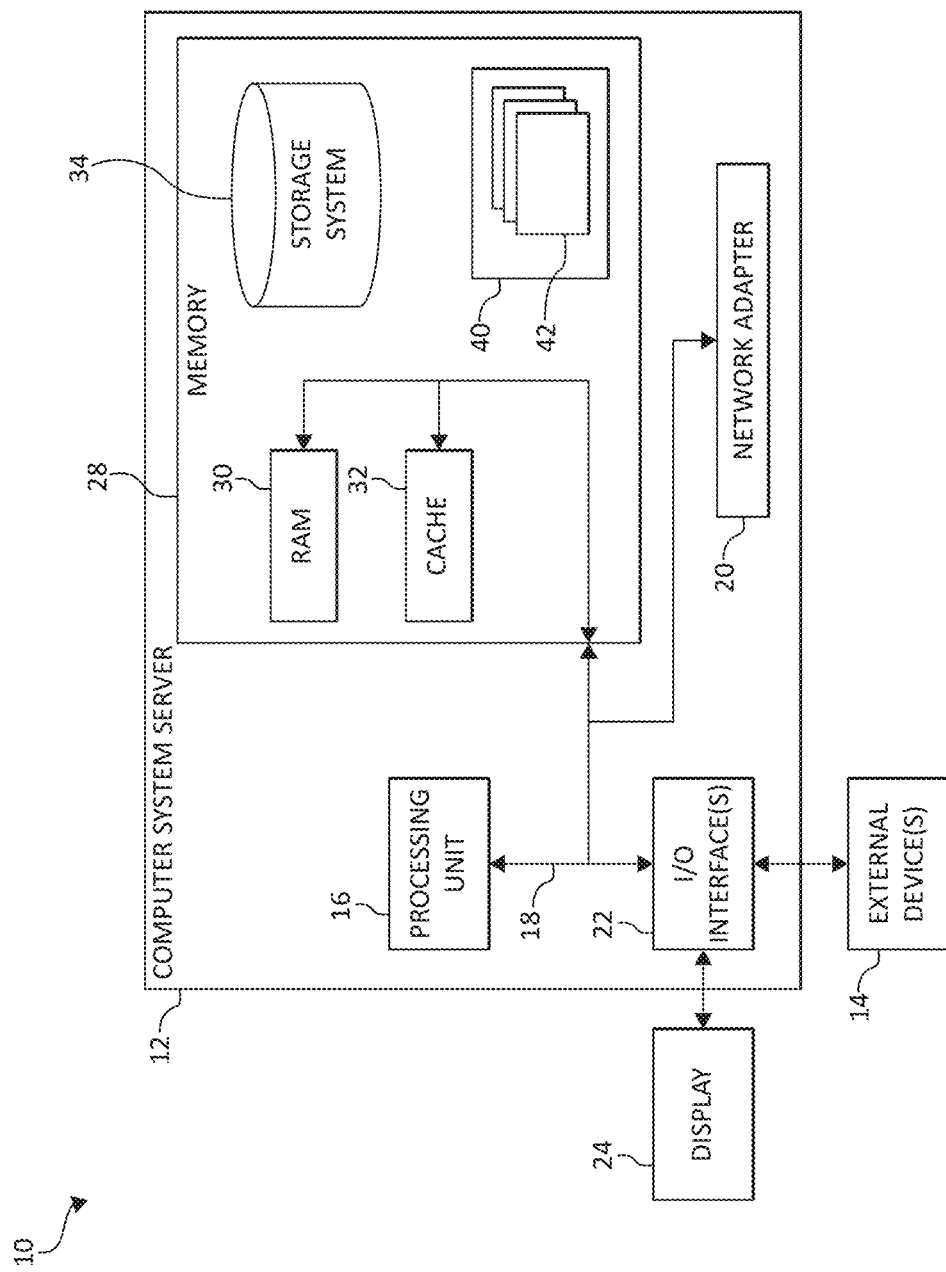
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, some entities (e.g., insurance services offered by insurance companies such as, for example, healthcare industry.) are typically accompanied by multiple policies, which describe a number of policy criteria under which these insurance services are applied. For example, in the healthcare industry, providers (as opposed to patients) may send claims directly to health care insurance agencies where such claims must follow specific compliance criteria specified by state and/or federal policies. An example, of policy criteria described in natural language for physical therapy services is "members may receive up to 48 units of any combination of physical therapy or occupational therapy services per 12 month period"). In one aspect, depending on a type of policy, the policy may contain hundreds/thousands of rules, which may be checked (e.g., a policy document may consist of more than 100 pages).

Additionally, providers (e.g., doctors, hospitals, etc.) may submit claims to an entity/payer (e.g., a health insurance agency or a government insurance program) for services rendered to patient. The entity/payer decides to either pay (e.g., valid claim) or reject a submitted claim (e.g., an invalid claim) based on the eligibility criteria for a particular service which are determined by policy guidelines. In one aspect, policy guidelines set out which claims are permissible based on eligibility criteria for a particular service and generally accepted medical practices. Program Integrity investigation units aim to assert that a correct payment has been made for the correct member for a correct service to a correct provider. Often, the investigation is done not at the time the claim is submitted but after the claims had been payed. Fraud, waste and abuse ("FWA) investigators need to prioritize investigations based on likelihood of recovery (in terms of financial recovery of inappropriate paid claims) and maximum return on investigation resources.

In one aspect, an invalid claim may be a claim that violated or infringed upon policy criteria either intentionally (e.g., fraudulent) or unintentionally (providing services unnecessary, inefficient or inconsistent with accepted business practices). The eligibility criteria described in various policies (e.g., healthcare policies) can be modeled as operational rules (e.g., business rules) that describe eligible providers (e.g., required role/license: physicians, nurses, etc.), eligible places of service (e.g., at home, in a hospital), a maximum number of units of service or types of equipment that a provider should report for a single patient in a selected period of time, pairs of services that should not be reported together (in combination) for the same patient in a single date, services unappropriated for the patient age or gender, and the like.

To decide by an entity/payer whether to prioritize an investigation into a submitted claim, investigators need to know where the most recovery is (e.g., in terms of financial recovery) to ensure it is sufficient to warrant further investigation. In order to do so, investigators need to locate and understand the policy documentation. Policy information may include hundreds of pages of unstructured text containing the compliance rules that investigators have to search through, review and reference to support their daily work. Understanding the content of policy and verifying regulation adherence is critical to ensure recovery of inappropriately paid claims, yet costly in terms of time and resource.

Currently, however, investigators need to know more than whether a provider of services is fraudulent, and investigators need to further analyze a provider's claim in the context of policy rules to further the investigation. Additionally, an investigation fails to ensure and guarantee recovery particularly since a policy may to be too vague to be enforced, or the recoverable amounts too low to warrant action (e.g., low return on investment). Thus, a need exists to discover potential policy coverage gaps in various rules and policies for claim auditing (e.g., to detect valid, invalid, fraudulent, abusive and wasteful claims based on a particular policy).

Accordingly, the present invention provides for intelligent policy coverage gap discovery and policy coverage optimization. One or more policy coverage gaps in one or more operational rules defined by one or more rules, policies, or a combination thereof may be identified. The one or more policy coverage gaps may be ranked according to one or more selected criteria.

It should be noted that as used herein, the operation rules may describe the compliant and non-compliant criteria in the context of policy and may be used for semi-automatically verifying regulation adherence, which may be used to support an investigation task. Operational rules may be machine executable and may represent policy regulations for structured or semi-structured enterprise's operational claims. The operation rules may be in the form of a knowledge graph, logical rules, etc. The operation rules may be executed on top of claims to (automatically) determine the compliance to legal/policy constraints of an enterprise's operations and flags potentially non-compliant claims (e.g., finding claims that go over a threshold or an allowed limit of a given service for a given eligible patient per year. In other words, the operation rules may mark claims as valid (with respect to that operational rule) or invalid. Thus, an administrator, machine learning operation, and/or an investigator can curate the rules and/or prioritize the operation rules in order to avoid conflicts. In one aspect, the present invention takes these curated operational rules as input as well as the policy they refer to and the operational data (claims) covered by the policy/rules.

In one aspect, the present invention provides a novel solution to detect gaps in policy and operational rules in order to audit against operational data (i.e., claims). Claims that are not handled by compliance operational rules may be grouped from policies and one or more policy coverage gaps may be identified based on a set of conditions and/or values not covered by the policy in order to audit against the group(s) of operational claims. Text data in policy that it is relevant for the claim data may be identified. That is, text data that is partially covering the claims but insufficient to validate or invalidate a group(s) of operational data may be identified. For example, the identified text data in a policy may be 1) too vague to be applicable, 2) ambiguous/missing a definition, 3) enforcing a condition that does not apply to the claims, 4) unknown for an unspecified value in claims, etc.). One or more candidate improvements may be suggested to policy makers (backed up with evidence) to fill the loopholes in policy to support auditing investigations to find and prosecute inappropriate payments/claims. The candidate improvements may be prioritized based on a potential impact—e.g., prioritized based value such as, for example, prioritized based on a percentage or potential of recovery (e.g., monetary recovery) of potentially inappropriate paid claims or the size of the group of claims.

In one aspect, the present invention may support a claim audit (e.g., an insurance claim audit) to support policy makers/regulation analysts to identify policy loopholes with the aim to reduce FWA on claims. In order to do so, the present invention may identify one or more sets of claims for which there is a relevant policy (e.g., policy describing the compliance criteria for the billed services in the claim), but the claims could neither be validated or invalidated with the policy operational rules. The mechanisms of the illustrated embodiments may group the claims based on selected portions or parts of a policy that partially describes the claims (similarities) and the conditions or parameters for which the rules are unable to be applied. It should be noted that a claim may belong to more than one group/cluster.

These groups of claims may be prioritized and/or ranked based on the likelihood to one or more ranking factors such as, for example, based on the claim being invalid, value of the claim, and/or ability/potential for monetary recover (which may be above or below a defined threshold). In one aspect, those of the groups ranked over a (configurable) threshold may be presented to a machine learning system or to an administrator, and/or policy investigators via a graphical user interface ("GUI") together with the current relevant (e.g., partially covering operational rules) operational rules, the rules/policies along with evidence and/or an explanation on what makes these claims uncertain (e.g., the combination of condition/values).

In an additional aspect, current, relevant (partially covering) operational rules, the rules/policies and the explanation on what makes these claims uncertain and the evidence (the operational claims) may be reviewed. If the claims fail to be covered by the policy (e.g., the claims is not 100% covered or fails to provide coverage up to a defined threshold) based on one or more identified reasons, feedback may be collected and used. For example, the feedback may be based on whether the suggested uncertain combination of condition/values to identify and cover/fill in the gap in policies are relevant to suggest changes to policy makers, backed up with accurate claims and policy evidence, as well as the potential financial impact. In turn, this further validates the operational rules system operations. Otherwise, feedback is captured from machine learning and/or one or more users (e.g., investigators) in order to fix or add new operational rules into the system that makes the group of claims compliance or un-compliance, or mark the group of claims as non-relevant. Thus, a machine learning operation may collect and use the feedback to improve operational rules to reduce and potentially eliminate any policy coverage area gaps.

It should be noted that operational rules may be extracted from one or more policies (e.g., using natural language processing "NLP" operations). The operational rules may be represented in a semi-structured form (e.g., a knowledge graph). Also, one or more operational rules (e.g., business rules) may be extracted from a knowledge graph that represents one or more policy compliance criteria/conditions for operational data (e.g., a submitted claim). Using the knowledge graph and the operational data, the present invention may identify (or assist on the building of) the operational rules (e.g., business rules), which can be applied over the operational data (e.g., semi-structured or structured data) to identify and/or flag non-compliant operational data (e.g., non-compliant claims or policy claim gaps).

It should be noted that although the current state of the art may perform one or more analytical operations (e.g., text mining, social network analysis, time series analysis, etc.) to identify fraudulent claims in a particular area of focus or industry (e.g., insurance/health care system), the present invention extracts rules from policy data to audit against operational claims data to support policy investigators to identify inappropriate payments by entities/payors to users/payees (whom may have submitted a fraudulent claim). Thus, the present invention provides novelty over the state of the art by extracting rules from policy data to audit against operational claims data.

In an additional aspect, the present invention may support policy/regulation analytical entities (e.g., a user or business) to identify policy violations and reduce fraud, waste of resources, and/or non-compliant claims by deriving logical executable benefit/operational rules from a knowledge graph representing policy regulations and structured or semi-structured enterprise's operational data (e.g., a claim) and identify policy coverage gaps/loopholes. The knowledge may be analyzed, interpreted, and/or learned to create operational rules (e.g., business benefit rules) that may (automatically) determine a compliant and/or non-compliant to legal or policy constraints of an enterprise's operations and identify/flag potentially non-compliant claims (e.g., finding claims that violate eligibility criteria for clients based on age and gender). A user may be enabled to verify one or more suggested policies/operational rules (e.g., verify a benefit rule) to address the policy claim gaps/loopholes and may also validate the rules (automatically extracted from knowledge graphs) applied to the operational data (e.g., claims), such as, for example, what makes a correct operational rules (e.g., a business benefit rule). The present invention may use feedback to learn to transform new policy knowledge into operational rules (e.g., business rules) that can execute on top of operational claim data.

Also, as used herein term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" (which may be included in the domain knowledge) is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
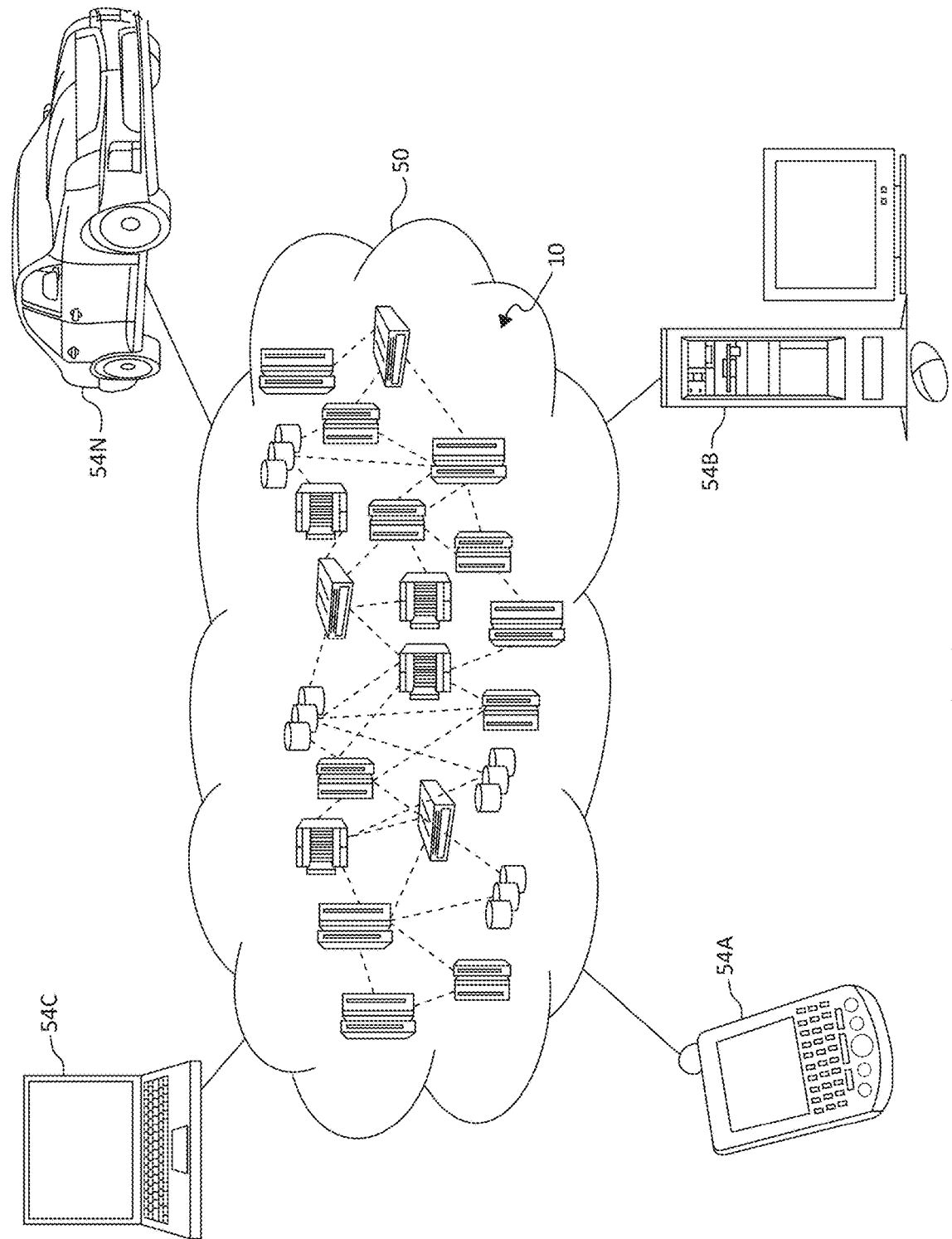
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
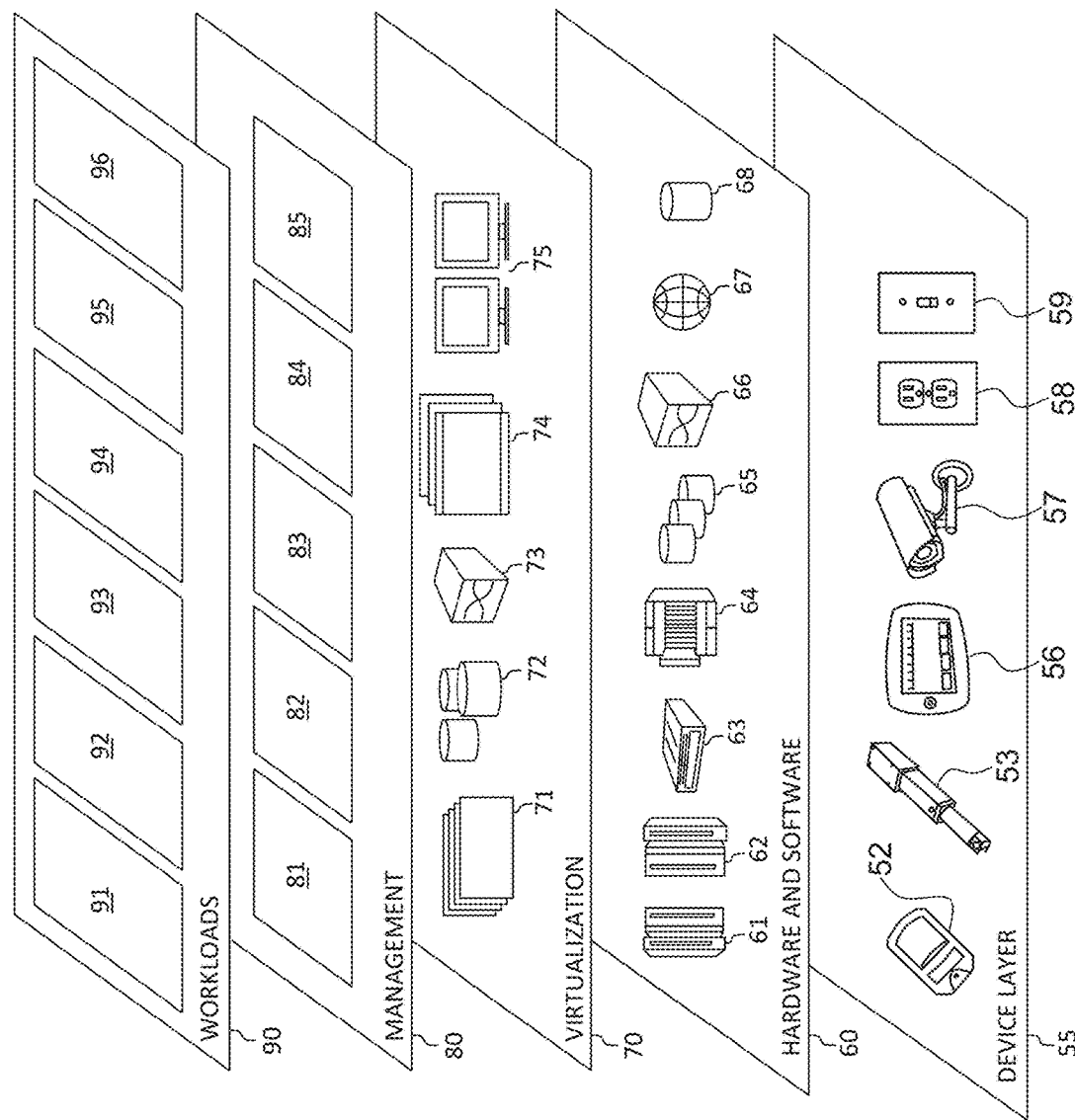
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent policy coverage gap discovery and policy coverage optimization. In addition, workloads and functions 96 for intelligent policy coverage gap discovery and policy coverage optimization may include such operations as analytics, entity and obligation analysis, and as will be further described, user and device management functions. One of ordinary skill in the art will appreciate that the workloads and functions 96 for intelligent policy coverage gap discovery and policy coverage optimization may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
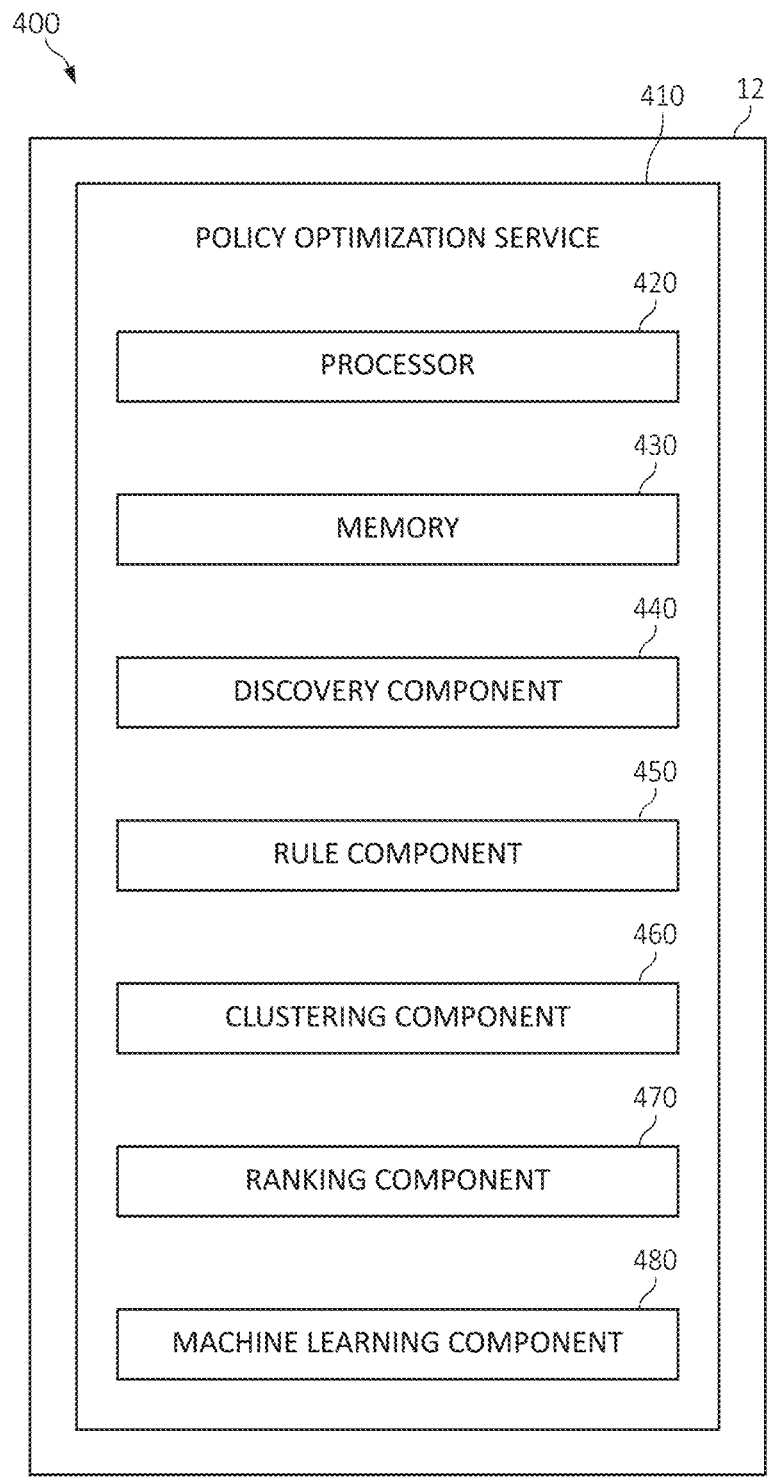
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A policy optimization service 410 is shown, incorporating processing unit ("processor") 420 to perform various computational, data processing and other functionality in accordance with various aspects of the present invention. The policy optimization service 410 may be provided by the computer system/server 12 of FIG. 1. The processing unit 420 may be in communication with memory 430. The policy optimization service 410 may include a discovery component 440, an rule component 450, a clustering component 460, a ranking component 470, and a machine learning component 480.

As one of ordinary skill in the art will appreciate, the depiction of the various functional units in policy optimization service 410 is for purposes of illustration, as the functional units may be located within the policy optimization service 410 or elsewhere within and/or between distributed computing components.

In one aspect, the discovery component 440 may identify one or more policy coverage gaps in one or more operational rules defined by one or more rules, policies, or a combination thereof. The discovery component 440 may determine one or more non-compliant operational rules from the one or more operational rules to identify the one or more policy coverage gaps.

In association with the discovery component 440, the rule component 450 may learn, identify, and/or analyze one or more operational rules from a knowledge graph, a domain knowledge, or a combination thereof describing one or more operational policies and conditions and apply the one or more operational rules to operational data to identify policy coverage area gaps/loopholes.

The clustering component 460 may cluster the one or more policy coverage gaps based on one or more of a plurality of factors (e.g., clustering factors).

The rule component 450 may generate one or more additional operational rules for eliminating the one or more policy coverage gaps. Also, the rule component 450 may modify the one or more operational rules for eliminating the one or more policy coverage gaps. The rule component 450, in association with the discovery component 440, may identify one or more rules from one or more segments of text data. The rule component 450, in association with the discovery component 440, may identify data relating to the one or more rules according to a knowledge domain. The rule component 450, in association with the discovery component 440, may ingest the text data from the policy data source upon processing the text data using a lexical analysis, parsing, extraction of concepts, semantic analysis, a machine learning operation, or a combination thereof, and/or use natural language processing (NLP) to determine the set of operational rules as knowledge graphs (with an associated weight/confidence score) from one or more segments of text data.

The rule component 450, in association with the discovery component 440, may identify, learn, suggest, modify, create, and/or build extracted operational rules from a knowledge graph, a domain knowledge, or a combination thereof describing one or more operational policies and conditions. The rule component 450, in association with the discovery component 440, may assign a score to the one or more operational rules indicating a degree of a policy coverage claim gap for operational data.

The ranking component 470 may rank the one or more policy coverage gaps according to one or more selected criteria.

The machine learning component 480 may learn those of the one or more operational rules eliminate the one or more policy coverage gaps from historical data, user feedback, one or more compliant operational rules, or a combination thereof. The machine learning component 480 may initialize learn, determine, or identify the one or more non-compliant operational rules having the one or more policy coverage gaps and/or revise the one or more operational rules according to collected feedback from a user.

The machine learning component 480 may determine those of the operational rules having the one or more policy coverage gaps, group the operational rules into one of a plurality of sub-groups, wherein each of the plurality of sub-groups represent an specific coverage area gap. The machine learning component 480 may create one or more additional operational rules that address the one or more policy coverage gaps in each of the plurality of sub-groups. The machine learning component 480 may rank the one or more additional operational rules.

By way of example only, the machine learning component 480 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
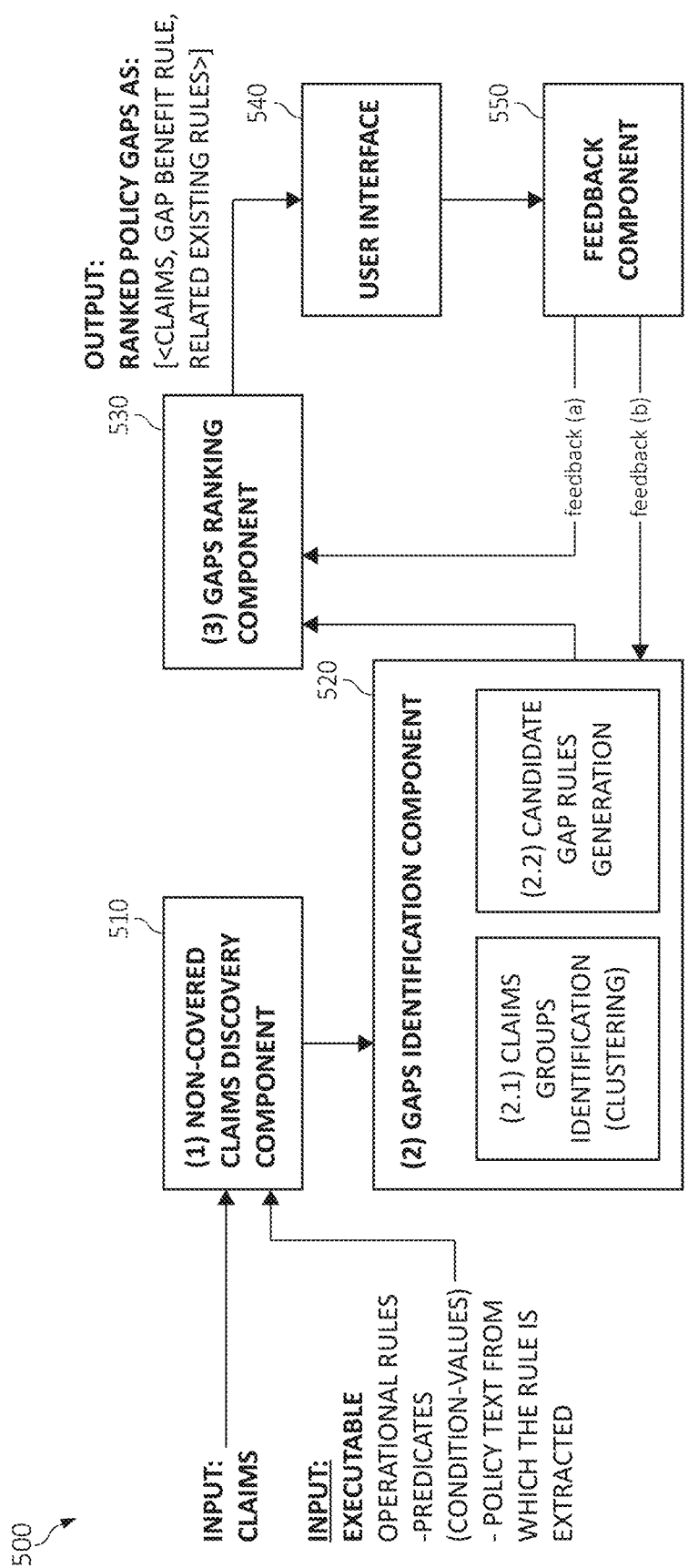
FIG. 5 is a flow diagram for providing intelligent policy coverage gap discovery and policy coverage optimization in accordance with aspects of the present invention.

Turning now to FIG. 5, block/flow diagram 500 is depicting for intelligent policy coverage gap discovery and policy coverage optimization for an entity. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5. Also, the computer system/server 12 of FIG. 1, incorporating processing unit 16, may be in association with a non-covered claims discovery component 510, a gaps identification component 520, a gaps ranking component 530, a user interface 540 (e.g., a GUI), and a feedback component 550.

As shown, the various blocks of functionality are depicted with arrows designating the blocks' 500 relationships with each other and to show process flow. Additionally, descriptive information is also seen relating each of the functional blocks 500. With the foregoing in mind, the module blocks 500 may also be incorporated into various hardware and software components of a system for intelligent policy coverage gap discovery and policy coverage optimization in accordance with the present invention. Many of the functional blocks 500 may execute as background processes on various components, either in distributed computing components, or on the user device, or elsewhere.

In step (1), the non-covered claims discovery component 510 receive one or more claims (e.g., as input data) and one or more executable operational rules (e.g., also as input data with executable benefit rules and associated policy text) and analyze, discover and return those claims that are not represented by any rule (i.e., no rule is applicable to the specific claim) such as, for example, non-covered claims and related policies. In an additional aspect, the non-covered claims discovery component 510 may returns all claims that contain elements (e.g., procedure codes) not mentioned in any of the input rules. The non-covered claims discovery component 510 may also execute the input operational rules over the claims data and returns all claims for which no rule has been executed.

In step (2), the gaps identification component 520 may receive the non-covered claims and related policies from the non-covered claims discovery component 510. In step (2.1), the gaps identification component 520 may take the non-covered claims (e.g., with related policies, if present) and splits them into groups (e.g., may identify the groups of claims and cluster them into groups). Each group may represent a potential policy gap (e.g., policy coverage area gaps). The gaps identification component 520 may include sub-component (performing the operations of step (2.1)) may be dedicated to identifying and generate the clustering features used to split the claims into groups.

Thus, the gaps identification component 520 may receive as input the non-covered claims with related executable benefit rules and associated policy text, if present. The output of the gaps identification component 520 may include a list of a groups of claims or even similar rules.

In one aspect, the clustering operation may use as clustering factors/features the rules that partially covered the claim (i.e., one or more rules that would cover the claim if n predicates or values were different, wherein n is a positive integer) and may use the policy information (rules) to generate candidate features/factors for the clustering operation. For example, identifying that for topical fluoride claims the relevant features are age range, units range, patient diagnosis, risk category, prior authorization, etc.

It should also be noted that the claims are group based on rules (or combinations) that are the most similar (e.g., rules that share the most features in common with a group of claims, where features can be conditions and/or condition/value pairs). That is, the claims may be claims that match almost all of the rule (e.g., greater than a defined percentage or threshold) but are missing one or more elements that will make the rule definitively apply to that claim. For example, a rule may have requirements for procedures, age range, number of units and being at risk. However, the claim(s) may match that rule by only procedure, age range and number of units but contain no information about risk or non-risk. For another rule, the claims may satisfy all conditions/values (e.g., procedures, number of units and being at risk), but does not address, satisfy, or even cover/address age range (the claims refer to members on a different age range). Therefore both rules almost cover those claims but not fully and the system is unable to determine whether those claims are compliant or not. Thus, for example, in applying a first rule, the claim may be valid as the rule matches a procedure, age range, unit ranged but differ on the risk. The second rule may be invalid as the claim matches the procedure, units, and risk but the age is above an age range.

In step (2.2), the gaps identification component 520 may also function as a gap rule generation component and identify the candidate gap rules. The gaps identification component 520 may takes the groups of non-covered claims (with related policies, if present) and generate candidate rules that may cover the policy gap. Thus, the gaps identification component 520 may be split in two sub-components: a sub-component to identify the logical gap (e.g., performing steps (2.1)) and generate the candidate logical rules for each group of (clustered claims) and most applicable (i.e., partially covering) policy rules (e.g., performing steps (2.2))

It should be noted that at this point the gaps identification component 520 may be unaware if the claims associated with the generated rules(s) should be marked as valid or invalid. Thus, the gaps identification component 520 may include an optional sub-component that identifies a percentage (e.g., the likelihood) of the generated rules to be valid or invalid (e.g., based on the most applicable rules or on historical data).

Thus, the gaps identification component 520 may also receive as input the non-covered claims and most applicable benefit rules with associated policy text and output a groups of claims, candidate gap rules, and/or similar rules. In an additional aspect, the gaps identification component 520 identify minimal changes to a rule (e.g., the most applicable/partially covering rule) so that it can execute (e.g., fully cover) on a group of claims. If there are multiple similar rules, the gaps identification component 520 may identify the logical gap between each of the similar rules (i.e., the minimal changes so that a new rule may be generated and executed on top of each of the claims in the noncovered group and does not conflict with other rules or other claims not in the cluster). It should also be noted that for each relevant cluster, there may be multiple relevant clusters and the logical gap may be identified (i.e., the set of condition/value pairs).

In step (3), a gaps ranking component 530 may take the identified policy gaps (received from the gaps identification component 520) and ranks the identified policy gaps based on different heuristics. The gaps ranking component 530 may include a sub-component that generates the ranking and identify the features.

Thus, the gaps ranking component 530 may receive as input the policy gaps as claims, gap rule(s), and/or similar rules. The gaps ranking component 530 then outputs ranked policy gaps. In an additional aspect, the gaps ranking component 530 may rank policy gaps based on a number/value of the claims present in the gap. The gaps ranking component 530 may also rank policy gaps based on the optimization of a set of criteria (e.g., monetary value recovery, outcomes impact, minimizing risk to vulnerable population, etc.).

For example, the gaps ranking component 530 may calculate potential monetary recovery if claims in the group are invalid (e.g., based on the cost of too high risk patient of age in between 4 and 18 that received over 2 units yearly (and less than 4)) and presents the evidence to the SMEs.

In step (4), the UI 540 and feedback component 550 may display the various outputs and enable the interaction with a user. The feedback component 550 may collect and process feedback (e.g., "feedback (b)") from a user to re-inject it in the gaps identification component 520 and gaps ranking component 530 (e.g., "feedback (a)") in order to improve their performance.

In an additional aspect, the feedback collected from the user may be used for: (a) adjusting the ranking operation, (b.1) improving the generation of the candidate gap rules (e.g., selecting the best candidate rules to cover the gap if there are multiple similar rules that require minimal changes and/or learn that it is preferred to change certain conditions like the high risk instead of the age range), (b.2) improving the identification of the likelihood of the rules to be valid or invalid. The feedback component 550 may include an optional sub-component to provide a natural language description of the policy gap to facilitate a user in describing the policy gap.

Again, it should be noted that the suggested candidate improvements in policy (rules) may be displayed via the UI 540 (e.g., displayed to experts), policy investigators or policy makers backed up with evidence to support the suggested candidate improvements in policy (rules). The displayed information may include the suggested operational rules (e.g., set of eligibility conditions and values) required/needed to fill in the policy gap loopholes in an operational rule/policy to support auditing investigations (to identify and appropriately respond to inappropriate claims). The displayed information may also include claims that are covered by the policy gap loophole and therefore are unable to optimized in order to be audited/warrant further investigation. The displayed information may also include potential monetary recovery and/or other used relevance criteria on the claims non-covered by policy. The displayed information may also the relevant policy text or rules (e.g., associated operational rules) partially covering the claims and/or a natural language generated description of the rules.

Figure 6:
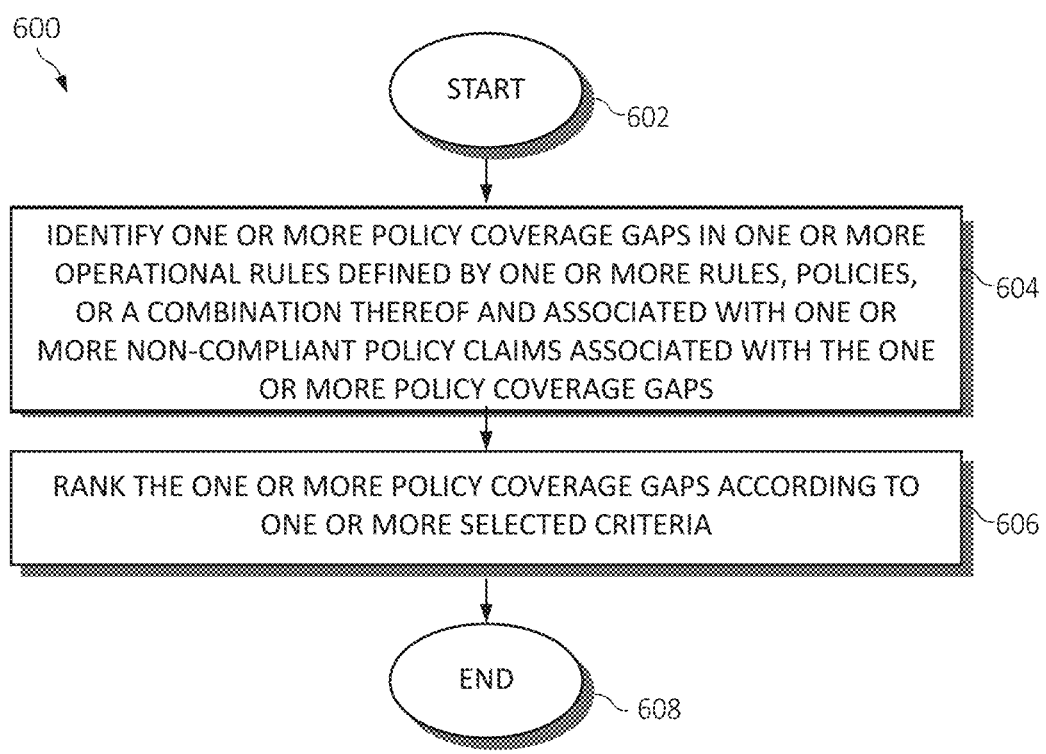
FIG. 6 is a flowchart diagram depicting an exemplary method for providing intelligent policy coverage gap discovery and policy coverage optimization in a computing environment in which aspects of the present invention may be realized.

Turning now to FIG. 6, a method 600 for providing intelligent policy coverage optimization in a computing system using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

One or more policy coverage gaps in one or more operational rules defined by one or more rules, policies, or a combination thereof and associated with one or more non-compliant policy claims associated with the one or more policy coverage gaps may be identified, as in block 604. The one or more policy coverage gaps may be ranked according to one or more selected criteria, as in block 606. The functionality 600 may end, as in block 608.

Figure 7:
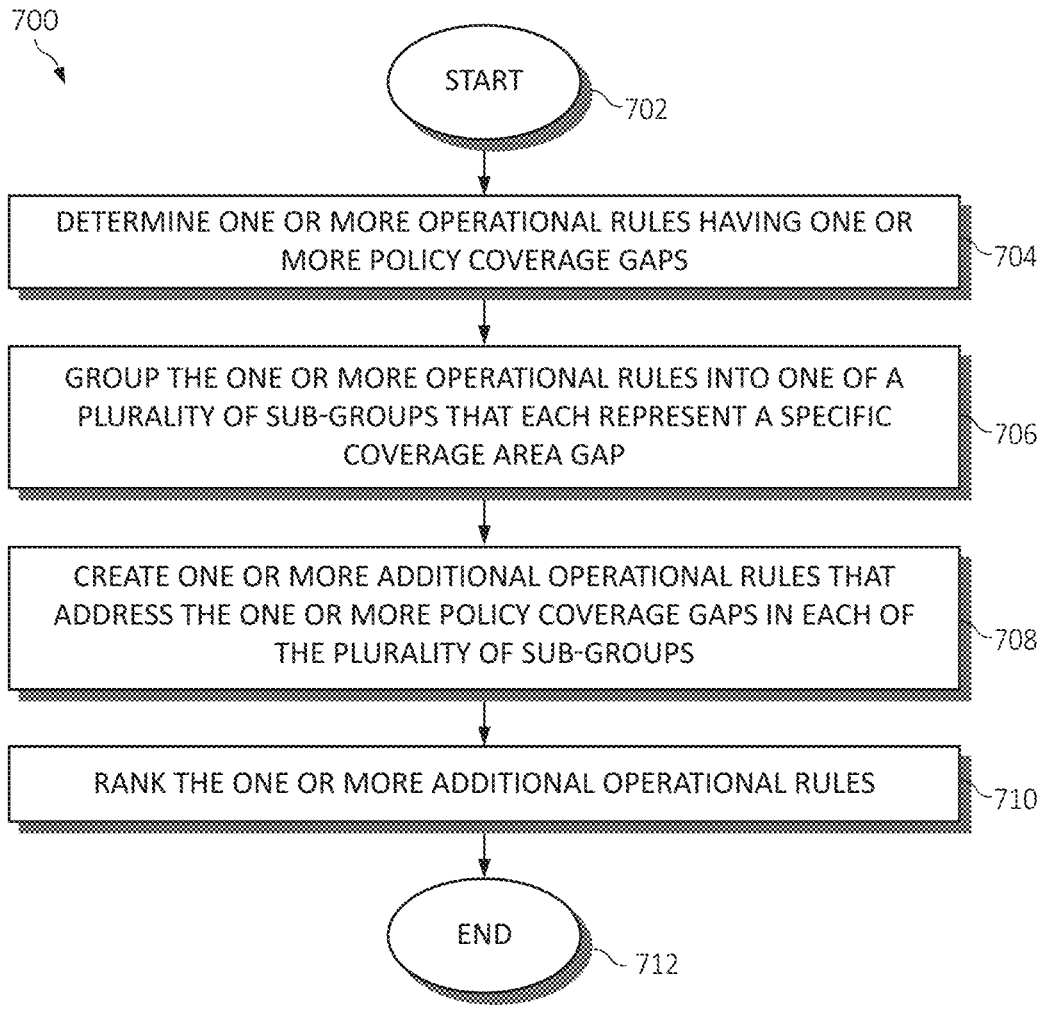
FIG. 7 is an additional flowchart diagram depicting an exemplary method for providing intelligent policy coverage gap discovery and policy coverage optimization in a computing environment in which aspects of the present invention may be realized.

Turning now to FIG. 7, an additional method 700 for providing intelligent policy coverage optimization in a computing system using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more operational rules having one or more policy coverage gaps may be determined, as in block 704. The one or more operational rules may be grouped into one of a plurality of sub-groups that each represent a specific coverage area gap, as in block 706. One or more additional operational rules that address the one or more policy coverage gaps in each of the plurality of sub-groups may be created, as in block 708. The one or more additional operational rules may be ranked, as in block 710. The functionality 700 may end, as in block 712.

Figure 8:
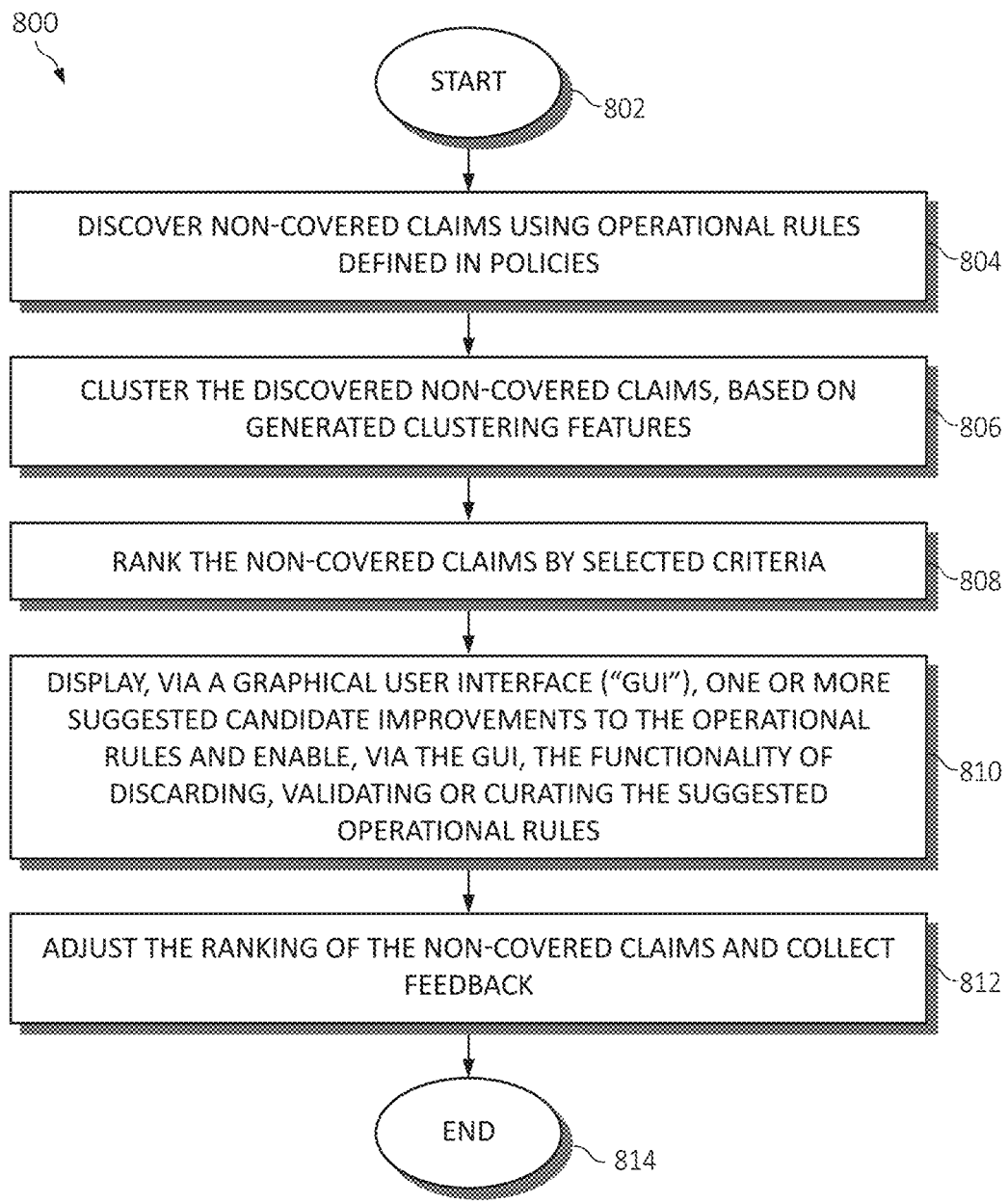
FIG. 8 is a flowchart diagram depicting an exemplary method for providing intelligent policy coverage gap discovery and policy coverage optimization in a computing environment according to an embodiment of the present invention by a processor, again in which aspects of the present invention may be realized.

Turning now to FIG. 8, an additional method 800 for providing intelligent policy coverage optimization in a computing system using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

Non-covered claims (e.g., non-compliant policy claim s) may be discovered using operational rules defined in one or more policies, as in block 804. The discovered non-covered claims, based on generated clustering features, may be clustered, as in block 806. The non-covered claims may be ranked by selected criteria, as in block 808. One or more suggested candidate improvements to the operational rules may be displayed, via a graphical user interface ("GUI") and the functionality of discarding, validating or curating the suggested operational rules may be enabled via the GUI, as in block 810. The ranking of the non-covered claims may be adjusted and feedback collected, as in block 812. The functionality 800 may end, as in block 814.

In one aspect, in conjunction with and/or as part of at least one blocks of FIGS. 6-8, the operations of 600, 700, and 800 may include each of the following. The operations of 600, 700, and 800 may ingest text data from a knowledge domain upon processing the text data using a lexical analysis, parsing, extraction of concepts, semantic analysis, a machine learning operation, or a combination thereof, and/or use natural language processing (NLP) to determine the operational rules, policies, and/or claims from one or more segments of text data.

The operations of 600, 700, and 800 may cluster the one or more policy coverage gaps based on one or more of a plurality of factors and determine one or more non-compliant operational rules from the one or more operational rules to identify the one or more policy coverage gaps.

The operations of 600, 700, and 800 may generate one or more additional operational rules for eliminating the one or more policy coverage gaps, and/or modify the one or more operational rules for eliminating the one or more policy coverage gaps.

The operations of 600, 700, and 800 may initialize a machine learning component that learns rules that eliminates the one or more policy coverage gaps from historical data, user feedback, one or more compliant operational rules, or a combination thereof. The operations of 600, 700, and 800 may learn, determine, or identify the one or more non-compliant operational rules having the one or more policy coverage gap and revise the one or more operational rules according to collected feedback from a user.

The operations of 600, 700, and 800 may initialize a machine learning component to determine those of the operational rules having the one or more policy coverage gaps, group the operational rules into one of a plurality of sub-groups, wherein each of the plurality of sub-groups represent an specific coverage area gap, create one or more additional operational rules that address the one or more policy coverage gaps in each of the plurality of sub-groups, rank the one or more additional operational rules, extract semantic data from a data source associated with the one or more operational rules, the one or more non-compliant policy claims, or one or more compliant policy claims, or perform a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for providing intelligent policy coverage optimization in a computing environment by a processor comprising: executing machine learning logic to generate a policy model using eligibility standards of an insurance policy as input data, wherein the eligibility criteria is modeled as one or more operational rules within the policy model; identifying, using the policy model, one or more policy coverage gaps in the one or more operational rules defined by one or more rules, policies, or a combination thereof and corresponding to one or more non-compliant policy claims associated with the one or more policy coverage gaps, wherein the one or more policy coverage gaps are deficiencies in the one or more operational rules that preclude enforcement of collection with respect to the one or more non-compliant policy claims previously remunerated to a claimant; ranking the one or more policy coverage gaps according to one or more selected criteria; displaying the ranked one or more policy coverage gaps on a user interface (UI): and receiving feedback data associated with an accuracy of the ranked one or more policy coverage gaps, wherein the feedback data is used to iteratively update the policy model to enhance the accuracy in identifying future policy coverage gaps over time.

2. The method of claim 1, further including clustering the one or more policy coverage gaps based on one or more of a plurality of factors.

3. The method of claim 1, further including determining one or more non-compliant operational rules from the one or more operational rules to identify the one or more policy coverage gaps.

4. The method of claim 1, further including:
generating one or more additional operational rules for eliminating the one or more policy coverage gaps;
identifying a possible validity or invalidity of the one or more operational rules or the one or more additional operational rules; or
modifying the one or more operational rules or the one or more additional operational rules for eliminating the one or more policy coverage gaps.

5. The method of claim 1, further including executing the machine learning logic to use the policy model to learn those of the one or more operational rules that eliminate the one or more policy coverage gaps from historical data, user feedback, one or more compliant operational rules, or a combination thereof.

6. The method of claim 1, further including:
learning, determining, or identifying one or more non-compliant operational rules having the one or more policy coverage gaps; and
revising the one or more operational rules according to the feedback data received from the user.

7. The method of claim 1 further including:
determining those of the one or more operational rules having the one or more policy coverage gaps;
grouping the operational rules into one of a plurality of sub-groups, wherein each of the plurality of sub-groups represent a specific coverage area gap;
creating one or more additional operational rules that address the one or more policy coverage gaps in each of the plurality of sub-groups;
ranking the one or more additional operational rules; or
extracting semantic data from a data source associated with the one or more operational rules, the one or more non-compliant policy claims, or one or more compliant policy claims.

8. A system for providing intelligent policy coverage optimization in a computing environment, comprising: one or more processors with executable instructions that when executed cause the system to: execute machine learning logic to generate a policy model using eligibility standards of an insurance policy as input data, wherein the eligibility criteria is modeled as one or more operational rules within the policy model; identify, using the policy model, one or more policy coverage gaps in the one or more operational rules defined by one or more rules, policies, or a combination thereof and corresponding to one or more non-compliant policy claims associated with the one or more policy coverage gaps, wherein the one or more policy coverage gaps are deficiencies in the one or more operational rules that preclude enforcement of collection with respect to the one or more non-compliant policy claims previously remunerated to a claimant; rank the one or more policy coverage gaps according to one or more selected criteria, display the ranked one or more policy coverage gaps on a user interface (UI); and receive feedback data associated with an accuracy of the ranked one or more policy coverage gaps, wherein the feedback data is used to iteratively update the policy model to enhance the accuracy in identifying future policy coverage gaps over time.

9. The system of claim 8, wherein the executable instructions further cluster the one or more policy coverage gaps based on one or more of a plurality of factors.

10. The system of claim 8, wherein the executable instructions further determine one or more non-compliant operational rules from the one or more operational rules to identify the one or more policy coverage gaps.

11. The system of claim 8, wherein the executable instructions further:
generate one or more additional operational rules for eliminating the one or more policy coverage gaps;
identify a possible validity or invalidity of the one or more operational rules or the one or more additional operational rules; or
modify the one or more operational rules or the one or more additional operational rules for eliminating the one or more policy coverage gaps.

12. The system of claim 8, wherein the executable instructions further execute the machine learning logic to use the policy model to learn those of the one or more operational rules that eliminate the one or more policy coverage gaps from historical data, user feedback, one or more compliant operational rules, or a combination thereof.

13. The system of claim 8, wherein the executable instructions further:
learn, determine, or identify one or more non-compliant operational rules having the one or more policy coverage gaps; and
revise the one or more operational rules according to the feedback data received from the user.

14. The system of claim 8, wherein the executable instructions further:
determine those of the one or more operational rules having the one or more policy coverage gaps;
group the operational rules into one of a plurality of sub-groups, wherein each of the plurality of sub-groups represent an specific coverage area gap;
create one or more additional operational rules that address the one or more policy coverage gaps in each of the plurality of sub-groups;
rank the one or more additional operational rules; or
extract semantic data from a data source associated with the one or more operational rules, the one or more non-compliant policy claims, or one or more compliant policy claims.

15. A computer program product for, by one or more processors, providing intelligent policy coverage optimization in a computing environment, the computer program product comprising a non-transitory computer-readable storage medium having computer-readable program code portions stored therein, the computer-readable program code portions comprising: an executable portion that executes machine learning logic to generate a policy model using eligibility standards of an insurance policy as input data, wherein the eligibility criteria is modeled as one or more operational rules within the policy model; an executable portion that identifies, using the policy model, one or more policy coverage gaps in the one or more operational rules defined by one or more rules, policies, or a combination thereof and corresponding to one or more non-compliant policy claims associated with the one or more policy coverage gaps, wherein the one or more policy coverage gaps are deficiencies in the one or more operational rules that preclude enforcement of collection with respect to the one or more non-compliant policy claims previously remunerated to a claimant; an executable portion that ranks the one or more policy coverage gaps according to one or more selected criteria; an executable portion that displays the ranked one or more policy coverage gaps on a user interface (UI); and an executable portion that receives feedback data associated with an accuracy of the ranked one or more policy coverage gaps, wherein the feedback data is used to iteratively update the policy model to enhance the accuracy in identifying future policy coverage gaps over time.

16. The computer program product of claim 15, further including an executable portion that:
clusters the one or more policy coverage gaps based on one or more of a plurality of factors; or
determines one or more non-compliant operational rules from the one or more operational rules.

17. The computer program product of claim 15, further including an executable portion that:
generates one or more additional operational rules for eliminating the one or more policy coverage gaps;
identifies a possible validity or invalidity of the one or more operational rules or the one or more additional operational rules; or
modifies the one or more operational rules or the one or more additional operational rules for eliminating the one or more policy coverage gaps.

18. The computer program product of claim 15, further including an executable portion that executes the machine learning logic to use the policy model to learn those of the one or more operational rules that eliminate the one or more policy coverage gaps from historical data, user feedback, one or more compliant operational rules, or a combination thereof.

19. The computer program product of claim 15, further including an executable portion that:
learns, determines, or identifies one or more non-compliant operational rules having the one or more policy coverage gaps; and
revises the one or more operational rules according to the feedback data received from the user.

20. The computer program product of claim 15, further including an executable portion that:
determines those of the one or more operational rules having the one or more policy coverage gaps;
groups the operational rules into one of a plurality of sub-groups, wherein each of the plurality of sub-groups represent an specific coverage area gap;
creates one or more additional operational rules that address the one or more policy coverage gaps in each of the plurality of sub-groups;
ranks the one or more additional operational rules; or extracts semantic data from a data source associated with the one or more operational rules, the one or more non-compliant policy claims, or one or more compliant policy claims.

* * * * *